United States Patent [19]

Ryan

[11] Patent Number: 4,598,235
[45] Date of Patent: Jul. 1, 1986

[54] METHOD AND APPARATUS FOR ELIMINATING LAG IN PHOTOELECTRIC TUBES

[75] Inventor: John O. Ryan, Cupertino, Calif.

[73] Assignee: Ampex Corporation, Redwood City, Calif.

[21] Appl. No.: 593,748

[22] Filed: Mar. 27, 1984

[51] Int. Cl.⁴ .................................... H01J 29/56
[52] U.S. Cl. ................................. 315/370; 315/387
[58] Field of Search ............. 358/219, 223, 243, 164; 315/370, 387, 390

[56] References Cited

U.S. PATENT DOCUMENTS 3,534,168  12/1970  Van Lookeren ............... 358/164
3,715,490  2/1973   Okada .......................... 358/223

Primary Examiner—Theodore M. Blum
Assistant Examiner—David Cain
Attorney, Agent, or Firm—George B. Almeida; Joel D. Talcott

[57] ABSTRACT

For each magnitude of charge stored on a section of a target of a photoelectric tube due to the action of incident light thereon, there is a specific value of cathode voltage which ensures the discharge of the section in one pass of the scanning beam. It follows that if the cathode receives a voltage whose instantaneous value is proportional to the magnitude of the charge stored on the corresponding portion of the target, the complete discharge of the target is effected in one pass of the scanning electron beam. Since the output voltage of a camera preamplifier at any instant is directly related to the magnitude of the charge stored on the corresponding portion of the target of the same tube or a different tube viewing the same scene, the preamplifier output voltage herein is selectively applied to the tube cathode, preferably with an appropriate transfer function, whereby lag in the tube is eliminated.

5 Claims, 5 Drawing Figures

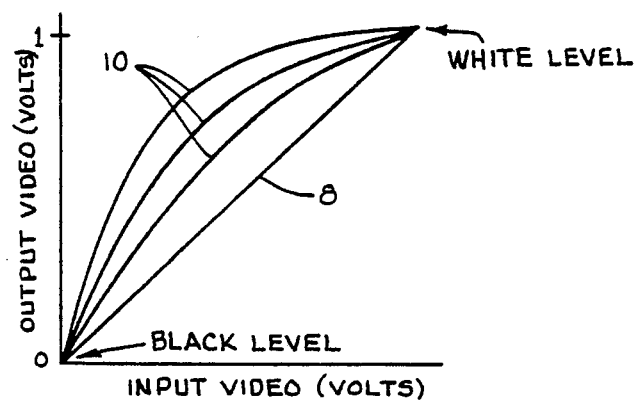
FIG_1
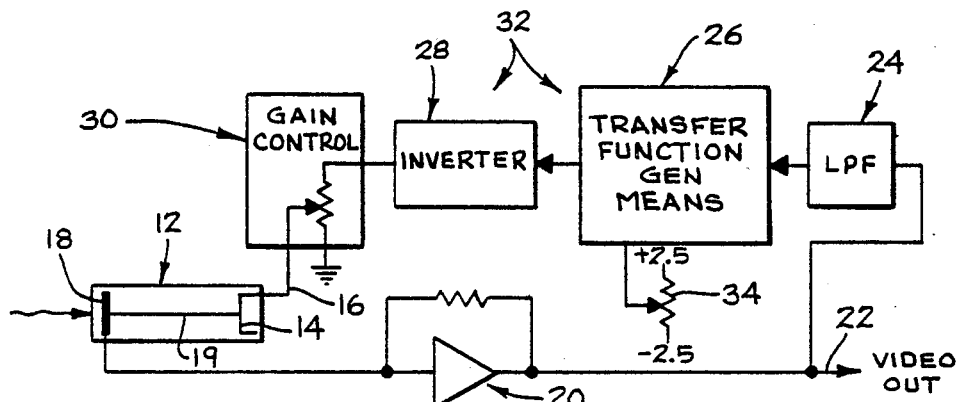
FIG_2
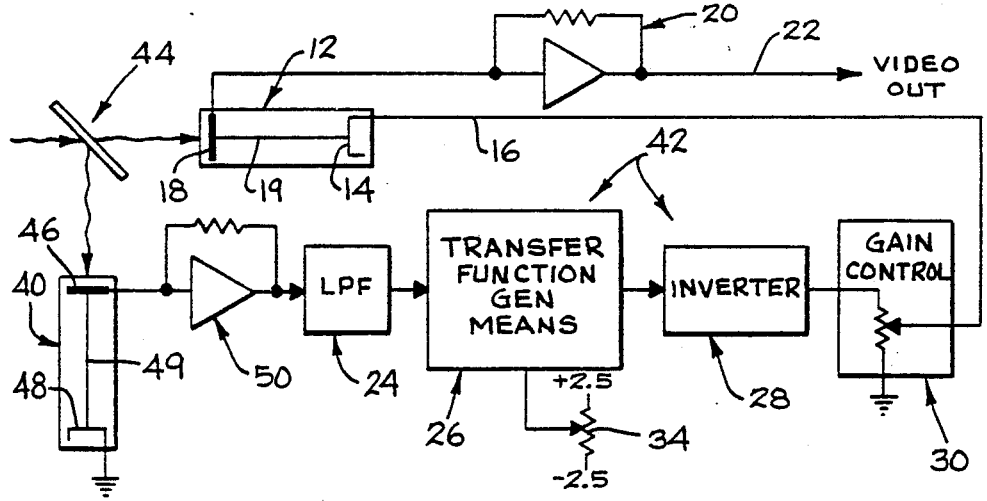
FIG_3

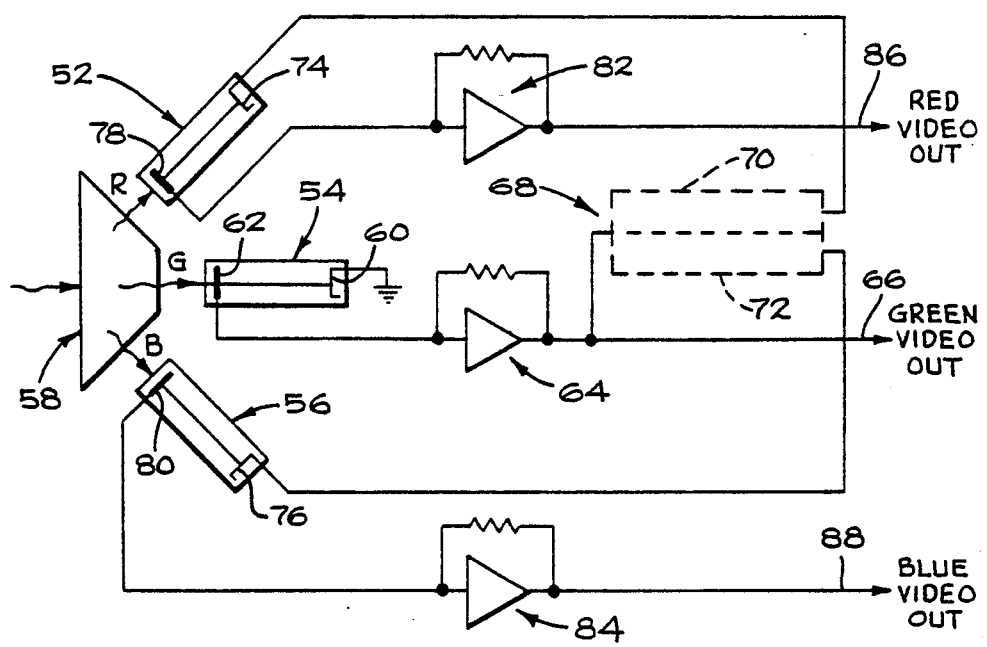
FIG_4

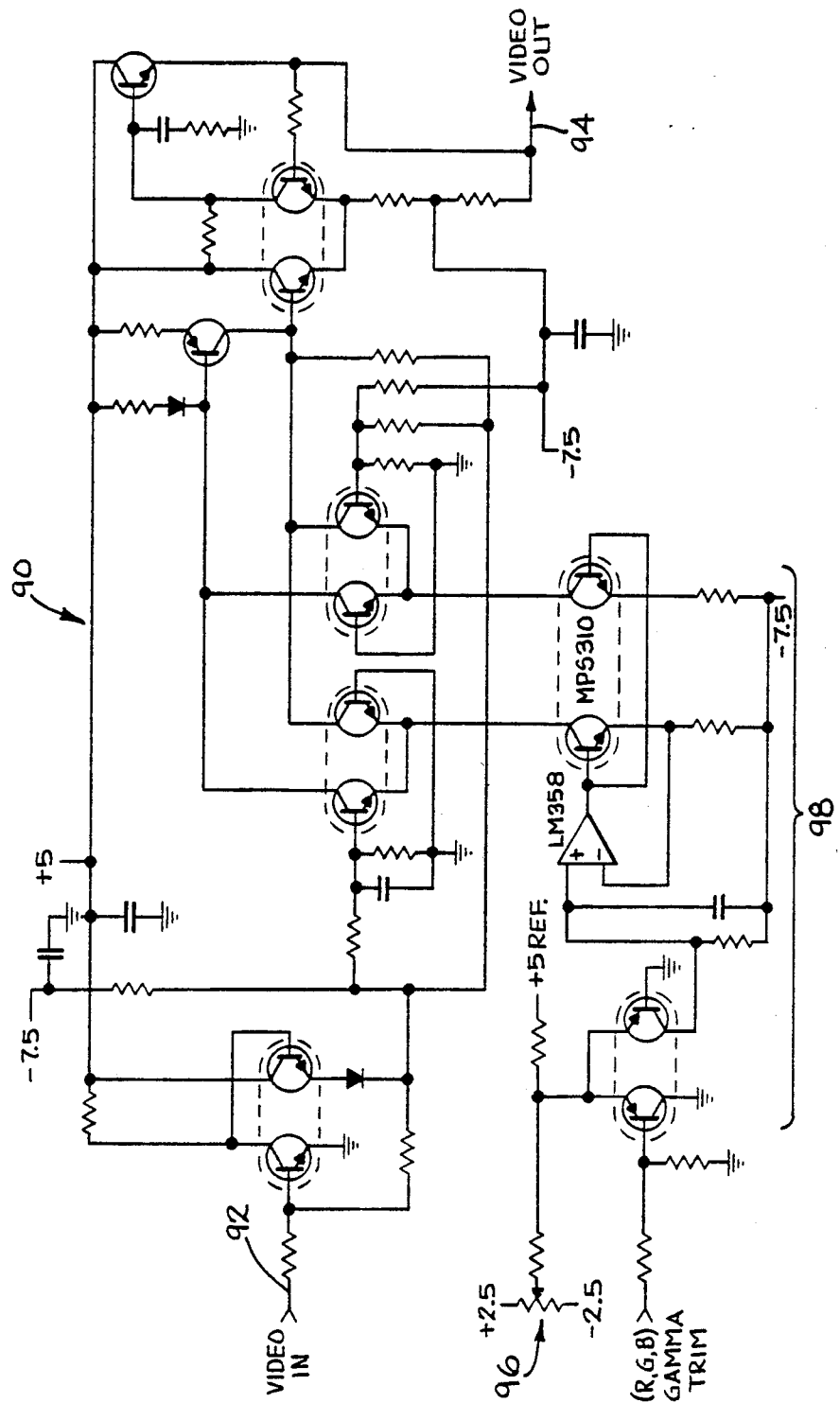
FIG_5

METHOD AND APPARATUS FOR ELIMINATING LAG IN PHOTOELECTRIC TUBES

BACKGROUND AND SUMMARY OF THE INVENTION

The invention relates to a method and circuit for eliminating beam induced lag in a photoelectric tube, i.e., lag that is caused by the capacitance of the target and the effective resistance of the scanning beam, of such types of tubes. Typical of such photoelectric tubes are the Plumbicon (a trademark of N. V. Philips), Saticon (a trademark of Hitachi Denshi, Ltd.), video camera image pickup tubes.

By way of example, lag in such image pickup tubes is due to the resistance of the scanning beam and the capacitance of the target layer upon which the image is formed. The resulting finite time that it takes for the beam to charge the target layer gives rise to lag. It follows that in the design of sophisticated image pickup tubes, there are several operating parameters and structural configurations between which compromises must be made in order to provide the optimum tube efficiency. The primary compromise made in the design of, for example, Plumbicon tubes or Saticon tubes, is between the tube parameters known as resolution and lag. To illustrate, to provide an increase in the resolution of a tube and thus an increase in the image sharpness, the thickness of the target layer is reduced to minimize the scattering of light in the layer and the corresponding attendant loss of resolution. However, as the thickness of the layer is reduced, the capacitance increases, which increases the undesirable effects of lag during tube operation. Therefore, tubes presently are fabricated with compromised resolution because of the subsequent undesirable effects of lag. It follows that if lag can be eliminated, either by fabrication or structural techniques applied during manufacturing, or by electronic or operating techniques applied during use of the tube, then resolution could be maximized to provide tubes which would generate the sharpest possible video picture.

The traditional approach to the reduction of lag in camera pickup tubes has been, and still is, by means of what is commonly termed the bias light technique. Since lag is most evident in the darker areas of the picture the bias light is used to set a minimum light level. More particularly a lamp housed within the prism assembly of a television camera is used to evenly illuminate the faceplates of the pickup tube or tubes. However, the resulting video signal generated by the tubes is undesirably modified in accordance with the illuminating bias light.

It follows that additional circuitry must be employed in the video processing circuits to subtract the portion of the video signal generated by the bias light from the resulting modified video, to recreate the original scene viewed by the camera. Such circuitry is unduly complex and requires on the order of sixteen or more remotely controlled functions. Thus the bias light technique complicates the camera circuitry.

In addition, the bias light technique has the disadvantage of exaggerating the effect of unclean optics in the camera. Thus dirt or scratches, which normally would not be visible in the picture are, in effect, magnified by the use of bias light.

Typical of camera systems employing the light bias technique are those employed, for example, in the BCC-20 broadcast color camera manufactured by Ampex Corporation.

The invention overcomes the disadvantages of the bias light technique by providing a technique for reducing lag which is equally as effective, but which is significantly simpler to implement and control. Further, the invention allows a tube manufacturer to optimize the built-in resolution of the tube even though doing so provides tubes with prohibitive lag characteristics, since the undesirable effects of the increased lag are eliminated by the invention combination during operation of the tube.

The inventor has determined that for each value of charge stored on a specific section of the target of a photoelectric tube due to the action of incident light, there is a specific value of cathode voltage which ensures that that section of the target will be discharged to the dark value corresponding to the black level, in one pass of the scanning electron beam.

To this end, a voltage representative of the video output signal generated by a tube is supplied to a circuit having a selected, and preferably adjustable, transfer function characteristic such as typified, for example, by a logarithmic function or fractional power law curve as generated by gamma corrector circuits used in conventional video signal processing systems. The resulting non-linear signal is inverted and applied to a cathode of the tube via gain control means. Thus, in effect, the cathode is supplied with a feedback voltage whose value at any instant is proportional to the magnitude of the charge stored on the corresponding portion of the target being read out. Complete discharge can be effected with one pass of the scanning beam, resulting in the elimination of lag.

Accordingly, it is an object of the invention to provide a technique for eliminating lag in camera pickup tubes which is significantly simpler to implement than the prior art bias light technique, and gives rise to a generally cleaner black level.

Another object of the invention is to provide a selected voltage to the cathode of a photoelectric tube which ensures the complete discharge of charge generated by light incident on respective sections of the target in one pass of the scanning beam.

A further object is to supply a voltage to the cathode of a photoelectric tube which is an instantaneous value indicative of the charge on the respective portion, pixel, etc., of the target.

A still further object is to eliminate lag in a photoelectric tube by supplying a selected feedback voltage to the tube which is derived from the same or a different tube.

Another object is to eliminate lag in an image pickup tube via electronic means whereby the tube may be manufactured without a compromise between resolution and lag, to maximize the resolution of the tube.

Yet a further object is to provide a selected voltage to the cathode of a pickup tube to eliminate lag, wherein the voltage is conformed to the lag characteristic of the tube via a selected transfer function relationship.

BRIEF DESCRIPTION OF THE DRAWINGS

FIG. 1 is a graph of a family of curves depicting a preferred transfer function relationship for adjusting the electrical voltage applied to the cathode of a tube.

FIG. 2 is a block diagram illustrating one embodiment for implementing the lag eliminating technique of the invention combination.

FIG. 3 is a block diagram illustrating an alternative embodiment of the invention combination.

FIG. 4 is a block diagram illustrating a further embodiment of the invention.

FIG. 5 is a schematic diagram illustrating a circuit for providing a typical non-linear transfer function relationship.

DESCRIPTION OF THE PREFERRED EMBODIMENTS

For each value of charge stored on a specific section of the target of a photoelectric tube due to the action of incident light, there is a specific value of cathode voltage which ensures that that section of the target will be discharged to the dark value corresponding to the black level, in one pass of the scanning electron beam. This voltage is negative in the case of a tube with a grounded cathode, and its value is a monotonic function of the magnitude of the stored charge in each section. It follows that if the cathode is connected to a voltage source whose instantaneous value is correctly related to the magnitude of the charge stored on the corresponding section of the target, then complete discharge is effected in one pass of the scanning electron beam. This condition eliminates beam induced lag.

The above condition is realized, for example, in a video camera system, by utilizing the fact that the instantaneous video output voltage from a conventional video preamplifier is directly related to the magnitude of the charge stored on the corresponding section of the pickup tube target. It follows that if the output voltage from the preamplifier, or a reasonably similar representation of the output voltage, is applied back to the tube cathode, particularly via an amplifier with the appropriate transfer function, the above condition is achieved and lag is eliminated.

The ideal transfer function is a complex function of many parameters including the beam current and scanning orthogonality, and has the general shape of the logarithmic function as depicted in FIG. 1. More particularly, the transfer function may be generated by a device with a non-linear characteristic such as, for example, a circuit for generating the power law characteristic such as used in gamma correctors in video signal processing circuits. Thus, the graph of FIG. 1 depicts a linear transfer function (curve 8), and a family of non-linear transfer functions (curves 10) having an input video value at zero volt corresponding to black level and an input video value, for example, at 1 volt, corresponding to peak white level. The range of values between black level and white level correspond to the various shades of grey, and the different curves 10 illustrate a power law relationship of such various range of values, such as obtained in gamma corrector circuits via adjustment of an associated integral potentiometer. The adjustment allows selecting the degree of non-linearity of the transfer function to match it to the lag characteristic of the tube and thereby eliminate lag for all shades of grey.

Referring to the block diagram of FIG. 2, a pickup tube 12 includes, inter alia, a cathode 14 coupled to an input line 16, and a target 18. Light corresponding to a viewed scene is imaged upon the faceplate of the tube and thus on the target 18. The instantaneous video signal commensurate with the charges on the target 18 is extracted from the target as it is scanned by an electron beam 19, and is fed to a preamplifier 20. The output voltage from the preamplifier is supplied to the usual video signal processing circuit (not shown) of a camera system via a video output line 22.

In accordance with the invention, the output voltage corresponding to the video signal from preamplifier 20, or a rendition thereof, is fed herein as a feedback voltage to a low pass filter 24, and thence to transfer function generator means 26 having a selected transfer function, further discussed below. The output of the transfer function generator means 26 is fed back to the cathode 14 of the tube via inverter means 28, gain control means 30, and the line 16, thereby completing a feedback loop 32 of the invention combination.

In operation, the video output signal instantaneously generated by beam 19 scanning the stored charges in the target, is low pass filtered in filter 24 to remove noise inherent in the operation of the preamplifier 20. However, under given conditions, such as in low noise situations, the filter 24 may be deleted from the feedback loop 32. The filtered signal is modified via the transfer function generating means 26 in accordance with the nonlinear characteristics (curves 10, FIG. 1) selected via an adjustable potentiometer 34 which forms part of the means 26. Thus the potentiometer 34 controls the shape, i.e., the degree of non-linearity of the non-linear curve 10. The modified signal is fed to the inverter 28 which provides a feedback signal to the cathode which has the proper polarity to assure the latter is driven in the right direction. The feedback sense must be such that the brighter the image, the more negative the cathode is driven. However, normally the video signal generated in the camera is more positive as the image becomes brighter. Therefore, the video signal which is fed back via the loop 32 is inverted at some point in the loop to provide the proper polarity, i.e., to drive the cathode more negative as the image brightens.

The feedback signal is fed to a circuit defining the gain control means 30 which controls the magnitude of the signal fed back to the cathode 14. The gain control means 30 may be located at another point in the feedback loop 32, however it preferably is placed before the cathode 14.

The non-linear transfer function generator means 26 provides non-linearity over a selected range of video signals; for example, as in FIG. 1, it operates from zero at black level to 1 volt at peak white level. Thus, to calibrate the feedback loop 32, the gain of the preamplifier 20 is pre-set to generate a signal of 1 volt for light ranging from zero to 100%. Next, the gain control means 30 is adjusted such that in the presence of 100% light, the effect of lag seen on the tube is completely eliminated. Then the non-linear characteristic of the transfer function generator means 26 is adjusted via the potentiometer 34, to eliminate lag along the full range of video voltage of from zero to 1 volt, i.e., through all levels of grey from the white to black levels. As may be seen from FIG. 1, the latter adjustment has no effect on the value of white level. The circuit now is calibrated to eliminate the effects of lag in the tube 12 at all levels over the full range of the video signal.

Obviously, in a three-tube color television camera, each tube may be provided with a respective feedback loop such as depicted in FIG. 2, whereby lag may be eliminated in respective tubes of the red, green and blue color channels. In a black/white camera the single black/white tube requires only the single feedback loop.

Since the feedback loop 32 of FIG. 2 provides in essence positive feedback, a given amount of circuit instability may be experienced. FIG. 3, depicts an alternative embodiment of the invention combination, herein depicted by way of example only, as a monochromic camera, employing a "primary" photoelectric tube, i.e., tube 12, and an "auxiliary" photoelectric tube, hereinafter termed a feedback tube 40, in a feedback loop 42. In FIGS. 2 and 3 like components are similarly numbered. It follows that the video signal fed back to the cathode 14 of the primary tube 12 is derived from a separate and different tube than the tube which provides the video signal output. The feedback tube 40 is disposed to view the same scene as does the primary tube 12, by means of a light separating optical system 44, i.e., a beam splitting mirror, which receives incident light generated by the scene. The system 44 may direct any selected fraction of the light to the feedback tube 40, i.e., one-half, one-quarter, or some smaller fraction of the light received by the optical system 44. As in FIG. 2, the purpose of the feedback tube 40 and the associated feedback loop 42, is to generate a feedback voltage representative of the video signal generated by the primary tube 12, to drive the cathode 14 of the latter tube in the manner described in FIG. 2. Thus, the feedback voltage is a monotonic function of the magnitude of the stored charge in each section of the target of the primary tube 12. The tubes should be substantially in spatial registration with each other.

The separated light is fed to a target 46 of the auxiliary or feedback tube 40, wherein a cathode 48 thereof is coupled in a grounded cathode configuration and supplies the scanning electron beam 49. The target 46 provides a feedback voltage signal to a preamplifier 50, and thence to the low pass filter 24, if a filter is employed. The signal is modified as described in FIG. 2 via the transfer function generator means 26 and integral adjusting potentiometer 34. The modified feedback signal is inverted via the inverter 28, and is fed back to the cathode 14 of the primary tube 12 via the gain control means 30 and line 16, to define the feedback loop 42. The loop components are adjusted for operation as described above in FIG. 2. The resulting lag-free video output signal is derived via the target 18 of the primary tube 12, the preamplifier circuit 20 and the video output line 22.

FIG. 4 illustrates a further embodiment of the invention combination, employing red, green and blue color image pickup tubes 52, 54 and 56 respectively, of, for example, a typical three tube color video camera. The embodiment is a further modification of the systems of FIGS. 2 and 3, wherein like components are similarly numbered, and which is particularly employed with plural color image pickup tubes.

It is generally known that in a typical color video camera system, the green color tube and thus the green signal channel, generates a green color signal that constitutes the largest portion of the composite color video signal, due to the inherent nature of light. It follows therefore, that the green video signal is less affected by lag and accordingly may be used to represent the true video signal indicative of the incoming light from a scene. It also is known that the red tube, and especially the blue tube, generate red and blue color signals of proportionally less magnitude, which are respectively more affected by lag, and which thus cause the greater portion of lag effects. It follows, the green video signal may be used as the feedback voltage signal in accordance with the invention, whose instantaneous value is proportional to the magnitude of the charge stored on the corresponding portion of the targets, such as provided for example by the auxiliary tube 40 of FIG. 3.

To this end, the color tubes are in register with each other and are conventionally disposed to receive respective red, green and blue (R, G, B) light from the common scene via a light separating optical system, herein depicted as optical prism means 58. A cathode 60 of the green tube 54 is grounded, and a target 62 thereof provides the green video output signal via a preamplifier 64 and a green video output line 66. In accordance with the invention, the green video signal also is provided, as from the preamplifier 64, to feedback loop means 68 depicted as a dashed-line block by way of example and which may comprise the feedback loop 32 or 42 of FIGS. 2 or 3, respectively. The loop means 68 may be a single series of components in a single loop, but preferably are two feedback loops 70, 72 which share a single low pass filter at the input thereof (if a filter is used), wherein loops 70, 72 are coupled back to a cathode 74 of the red tube 52, and to a cathode 76 of the blue tube 56, respectively. Targets 78 and 80 of the tubes 52, 56 provide the red and green video output signals via respective preamplifiers 82, 84 and output lines 86, 88. The loops 70, 72 are adjusted as previously described to provide the preferred feedback signal magnitude and nonlinearity for each respective tube.

Since the cathodes 74, 76 are driven by a feedback voltage which instantaneously is indicative of the charge on the corresponding portion of the green tube 54, and thus is substantially representative of the charge on corresponding portions of the respective red and blue tubes 52, 56, the feedback voltages to the latter tubes ensures the substantial discharge of the respective charges on the targets thereof, in one pass of the respective scanning beams. Thus the effects of lag, which are predominantly caused by the red tube and (particularly) the blue tube, are substantially removed from the composite video picture subsequently supplied by the camera system (not shown).

Although the embodiments of FIGS. 2, 3 and 4 employ the transfer function generating means 26, to provide a feedback voltage which is selectively modified throughout the range of the video signal generated by the photoelectric tube whose lag is being corrected, the invention combination contemplates a less efficient embodiment wherein the transfer function generating means 26 is deleted from the feedback loops 32, 42 and/or 68. In this latter embodiment, the feedback voltage is not tailored to conform to the lag characteristics over the full video range of from black to white levels. However, use of the feedback technique for applying a voltage to the cathode, which feedback voltage approximates the output voltage from the tube target and thus is proportional to the magnitude of the charge stored on the corresponding portion of the target, provides an appreciable reduction in the effects of lag.

FIG. 5 illustrates by way of example only, an embodiment of a gamma corrector circuit 90 which may be employed as described in the previous Figures as the nonlinear transfer function generating means 26. An input video line 92 and an output video line 94 correspond to the input and output, respectively, of the means 26 of the Figures. An adjustable potentiometer 96, and the immediately following conversion components indicated at 98, provide the degree of nonlinearity adjustment for the circuit, and thus the function of the adjustable potentiometer 34 of the means 26. A gamma trim input is provided to allow the conventional fine adjustment of each of the red, green and blue channels to account for differences in tube operating parameters. Since the configuration and function of a non-linear transfer function generator means is generally known per se, and is exemplified in the schematic diagram of FIG. 5, no further description is believed necessary herein.

What is claimed is:

1. A circuit for eliminating lag in a photoelectric tube having a cathode, a target, and an electron beam generated by the cathode for scanning an image on the target and for generating a video output signal, said circuit including a feedback loop for supplying an electrical voltage back to the cathode whose value at any instant is proportional to the intensity of the image on the corresponding portion of the target scanned by the electron beam, which voltage has a selected non-linear characteristic corresponding to the lag characteristic of the tube, comprising:

auxiliary tube means integral with the feedback loop and having a cathode coupled directly to ground and a target disposed to also retain the same image as scanned by said photoelectric tube, wherein the auxiliary tube means and feedback loop provide the electrical voltage of selected non-linear characteristic;

said photoelectric tube including an output terminal coupled to the target thereof for supplying said video output signal; and said target of the auxiliary tube means is coupled via the integral feedback loop back to only the cathode of the photoelectric tube.

2. The circuit of claim 1 wherein the auxiliary tube means receives a selected fraction of the light corresponding to the image which is scanned by the photoelectric tube.

3. The circuit of claim 1 further including second and third photoelectric tubes, each having respective second and third cathodes, targets and electron beams and disposed to retain the same image on the targets thereof that is scanned by the first photoelectric tube, and each having respective second and third video output terminals coupled from respective targets;

said feedback loop for generating the electrical voltage of non-linear characteristic is operatively coupled from the target of the auxiliary tube means back to only the respective second and third cathodes of the second and third photoelectric tubes.

4. A circuit for eliminating lag in photoelectric tubes having a cathode and a target for retaining charges indicative of an image, and including feedback loop means for supplying an instantaneous feedback voltage proportional to the magnitude of the charge stored on a corresponding portion of the targets, wherein the feedback loop means further provides a preselected transfer function corresponding to the lag characteristic of the tubes, comprising:

red, green and blue photoelectric tubes for generating red, green and blue video signals corresponding to the image via respective red, green and blue targets;

said feedback loop means being coupled from the target of the green photoelectric tube back to the cathodes of the red and blue photoelectric tubes to supply the instantaneous feedback voltage to the red and blue cathodes; and wherein said green photoelectric tube has its cathode coupled directly to ground.

5. A method for eliminating lag in a photoelectric tube having a target, a cathode and a scanning electron beam, and including generating a feedback voltage whose value at any instant is proportional to the intensity of light from an image which is supplied to the target scanned by the electron beam, which feedback voltage has a selected non-linear characteristic corresponding to the lag characteristic of the photoelectric tube, comprising:

separating a portion of the light from the image into a second light path;

directing the second path of light to a target of an auxiliary tube means to generate the feedback voltage;

conforming the feedback voltage to define the selected non-linear characteristic;

supplying the conformed feedback voltage back to only the cathode of the photoelectric tube;

grounding the cathode of the auxiliary tube; and supplying a video output signal via the target of the photoelectric tube.

* * * * *